United States Patent Office 3,092,592

Patented June 4, 1963

1

3,092,592
PREPARATION OF CELLULAR POLYURETHANE PLASTICS

Günther Nischk, Leverkusen, Peter Hoppe, Troisdorf, Günther Braun, Leverkusen, and Hans-Willi Paffrath, Cologne-Deutz, Germany, assignors, by direct and mesne assignments, of one-half to Farbenfabriken Bayer Aktiengesellschaft, Leverkusen, Germany, a corporation of Germany and one-half to Mobay Chemical Company, Pittsburgh, Pa., a corporation of Delaware No Drawing. Filed July 9, 1957, Ser. No. 670,627
Claims priority, application Germany July 14, 1956
4 Claims. (Cl. 260—2.5)

This invention relates generally to polyurethane plastics and, more particularly, to a method for making cellular polyurethane plastics of improved porosity and improved temperature resistant characteristics.

It has been proposed heretofore to manufacture cellular polyurethane plastics by reacting an organic polyisocyanate with an organic compound having at least two reactive hydrogen atoms and a molecular weight of at least about 500 and water. Substantially linear polyesters having terminal hydroxyl groups have been used most frequently as the organic compound having at least two reactive hydrogen atoms, but polyesters having terminal carboxyl groups as well as hydroxyl groups have also been utilized to react with the polyisocyanate. The resulting isocyanate-modified polyester having terminal isocyanate groups is reacted with water to produce the cellular product. In the latter reaction the water reacts with isocyanate groups in the isocyanate-modified polyhydroxy compound and with isocyanate groups of any unreacted polyisocyanate present to produce carbon dioxide which is trapped in the reaction product, thereby producing a porous or cellular structure. These heretofore available cellular polyurethane plastics are not resistant to temperatures above 90° C. and, consequently, unsuitable for use in applications where the cellular product will be exposed to temperatures above 90° C. for any appreciable length of time.

One method proposed for making low density cellular polyurethanes is disclosed in U.S. Patent 2,602,783. In accordance with that process, meta-toluylene diisocyanate is reacted with a difunctional monomeric compound, such as a dihydric alcohol or an amino alcohol, to form an addition compound which is reacted with a polyester and water to form the cellular product. The polyester may be prepared by condensing glycerol with phthalic anhydride and adipic acid or by condensing glycerol with phthalic acid and oleic acid. In each instance the polyester has an hydroxyl number of not more than 240 and a high acid number of from 5 to 80. Such a process has the disadvantage, inter alia, of requiring a separate reaction between the toluylene diisocyanate and a difunctional compound. To obtain a stronger foamed product application of external heat is desired during the procedure as well as a post-curing operation of from 10 to 20 hours at elevated temperature. The present process, however, is performed completely at room temperature.

It is therefore an object of this invention to provide a method for making cellular polyurethane plastics substantially devoid of the foregoing disadvantages. Another object of the invention is to provide a method for making cellular polyurethane plastics having improved resistance to elevated temperatures of 90° C. or more. Still another object of the invention is to provide a method for making cellular polyurethane plastics having an improved cellular structure. A further object of the invention is to provide a method for making low density cellular polyurethane plastics having improved resistance to water. A still further object of the invention is to provide a method for making cellular polyurethane plastics which are substantially resistant to temperatures above 90° C. and up to about 160° C.

2

The foregoing objects as well as others are accomplished in accordance with this invention, generally speaking, by providing a method for making a cellular polyurethane plastic which comprises reacting an organic polyisocyanate with a branched polyester or polyester amide having terminal hydroxyl groups and an hydroxyl number of at least 250 and water. The branched polyester or polyester amide is prepared by thermal condensation of a polyhydric alcohol with a saturated aliphatic polycarboxylic acid, at least one aromatic polycarboxylic acid and at least one unsaturated fatty acid. The polyester and polyester amide has an acid number of not more than 2. The polyesters and polyester amides are referred to frequently hereinafter as "polyhydroxy compounds."

Preferably, an amount of organic polyisocyanate in excess of that theoretically required to react with all of the hydroxyl groups in the polyester or polyester amide is used. The polyhydroxy compound, organic polyisocyanate and water may be mixed together simultaneously or the polyisocyanate and polyhydroxy compound may be reacted together in one step under substantially anhydrous conditions to form the isocyanate-modified polyester and the water may be added at a later time to bring about chemical reaction between the terminal isocyanate groups of the isocyanate-modified polyhydroxy compound and the water to form compounds of greater molecular weight having urethane linkages and carbon dioxide. The water will also react with isocyanate groups in any unreacted polyisocyanate present to form additional carbon dioxide.

Any suitable polyester or polyester amide or mixtures thereof may be used to react with any suitable organic polyisocyanate. The polyesters and polyester amides may be prepared by any known thermal condensation process. The saturated aliphatic polycarboxylic acids are preferably dicarboxylic acids and these acids may be condensed with an alcohol having more than two hydroxyl groups alone or in combination with a dihydric alcohol. In order to produce the desired branched polyester, however, at least some alcohol having more than two hydroxyl groups must be used. Preferably at least 50% of the polyhydric alcohol will be an alcohol having more than two hydroxyl groups. Ethylene glycol, propylene glycol, butylene glycol, hexane triol, trimethylol propane, pentaerythritol, perhydro-4,4'-dihydroxy diphenyl dimethyl methane, monoalylether and glycerine are examples of suitable polyhydric alcohols. Preferably, an excess of polyhydroxy alcohol is used to provide a polyhydroxy compound having predominantly hydroxyl terminal groups, although the polyhydroxy compound may have terminal carboxyl groups, if desired. In fact, the polyhydroxy compound may have some terminal OH groups and some terminal carboxyl groups.

Any suitable saturated aliphatic polycarboxylic acid, including any suitable saturated aliphatic dicarboxylic or tricarboxylic acid, may be utilized, such as, for example, adipic acid, sebacic acid, succinic acid, 6-amino caproic acid, citric acid and the like.

Any suitable aromatic polycarboxylic acid may be utilized to provide the aromatic portion of the polyester including, for example, phthalic anhydride, terephthalic acid, isophthalic acid, naphthylene-1,2-dicarboxylic acid and the like.

Any suitable unsaturated fatty acid may be utilized in preparing the polyester or polyester amide, such as, for example, the unsaturated acids derived by extraction of wood oil, oleic acid, elaidic acid, elaostearic acid, dehydrated ricinoleic acid or the like. Hydroxy amines or diamines may also be included along with the polyhydroxy compound in the condensation.

Any suitable organic polyisocyanate may be utilized to react with the polyester or polyester amide, such as, for example, toluylene-2,4-diisocyanate, toluylene-2,6-diisocyanate or mixtures thereof, hexamethylene diisocyanate, m-phenylene diisocyanate, p-phenylene diisocyanate, 1,5-naphthylene diisocyanate, triphenylmethane triisocyanate, 3,3′-dichloro-4,4′-biphenylene diisocyanate or the like. As indicated hereinbefore, more polyisocyanate than is required to react with all of the functional groups, i.e., hydroxyl and carboxyl groups of the polyhydroxy compound and water. It is preferred to use at least about two times the theoretical molar requirement of polyisocyanate.

In practicing the invention, the polyhydroxy compound and the organic polyisocyanate are rapidly mixed together with water whereby carbon dioxide is split off substantially immediately with the formation of a cellular structure of high molecular weight. Any suitable known accelerator and emulsifier may be included in the reaction mixture to accelerate the formation of the cellular material. Tertiary amines have been found particularly well suited for this purpose. Examples of suitable accelerators include methyl morpholine, ethyl morpholine, dimethylhexahydroaniline, diethylhexahydroaniline and the adipic acid ester of N-diethylamino ethanol and the like. Suitable emulsifiers include the alkali and amine salts of high molecular weight fatty acids, high molecular weight alkyl sulfonates and alkyl aryl sulfates and other compounds commonly used as detergents.

It is also possible, according to the present invention, to use to a subordinate degree, in addition to the above described polyesters, polyesters which are not modified by unsaturated fatty acids.

In addition to the very high heat resistance of the foam materials produced by the present process, they also have a very fine porous structure. Another advantage is to be seen in the fact that the new polyesters mix satisfactorily with the polyisocyanates, whereby they very quickly form a creamy structure and can be used for injection purposes, as the mixtures used in the known combined spraying and mixing devices, this creamy structure being very desirable for many purposes. The water resistance is also very good. In particular, after being boiled in water, there is no sign of any shrinkage. The steam diffusion density approaches the known good values of polystyrene cellular bodies. The hydroxyl number of the polyhydroxy compound must be at least 250 to provide a cellular polyurethane plastic having these advantageous characteristics. It is preferred to have hydroxyl numbers up to 450. If a polyester having a hydroxyl number of less than 250 is used, less urethane groups are formed and the degree of cross-linking is lowered. This results in products having diminished heat resistance and a tendency to swell in water.

*Example 1*

About 6,760 parts by weight of adipic acid, about 17,760 parts by weight of phthalic anhydride, about 42,000 parts by weight of trimethylolpropane, and about 17,000 parts by weight of oleic acid are gradually heated to an internal temperature of 210° C. while stirring in a current of nitrogen, water then being split off. When the transition temperature falls to 85° C. a vacuum is gradually applied to a value of 20 mm. When the acid number has fallen to 2, the heating is stopped. At about 140° C., the vacuum is removed and the hydroxyl number is then 350. Altogether, about 5,000 parts of water produced during the esterification are distilled over.

A. About 100 parts of this polyester are homogenized with about 7.5 parts of an activator mixture consisting of: About 3 parts by weight of N-diethyl-ethylamine phenyl ether, about 0.5 part by weight of permethylated diethylene triamine, and about 4 parts by weight of sodium salt of a sulfonated castor oil with a 54% water content and used as a component of an injection mixture in a spraying apparatus into which 85 parts of toluylene diisocyanate are injected. The cellular polyurethane plastic formed has a bulk density of about 29 kg./m.$^3$. The material is heat resistant up to about 140° C. No secondary shrinkage occurs after the foam has been boiled in water.

B. About 100 parts of the polyester prepared as indicated above are mixed with about 3 parts of N-diethyl ethylamine phenyl ether, about 1 part of permethylated diethylene triamine and about 4 parts of sodium salt of a sulfonated castor oil (water content 54%). Thereafter, about 85 parts by weight of toluylene diisocyanate are injected. The cellular polyurethane plastic formed has a bulk density of about 28 kg./m.$^3$ and a heat resistance of about 152° C. It is not possible to detect any secondary shrinkage after boiling.

C. About 5 parts by weight of acetyl cellulose in finely powdered form are added to the polyester prior to the reaction with the polyisocyanate and a highly porous light weight product with a bulk density of 30 kg./m.$^3$ which is heat resistant up to 148° C. is obtained. It is not possible to detect any shrinkage after boiling in water.

D. About 80 parts of the polyester prepared as indicated above are mixed with 20 parts of a branched polyester obtained from adipic acid, phthalic acid, trimethylol propane and triethanol amine (acid number 0, hydroxyl number 350). An activator mixture consisting of 3 parts of N-diethyl ethyl amine phenyl ether, 1 part of permethylated diethylene triamine and 4 parts of sodium salt of a sulfonated castor oil (water content 54%) is thereafter added. After adding 10 parts of a finely powdered phenol formaldehyde condensate, 85 parts by weight of toluylene diisocyanate are injected. The cellular polyurethane plastic formed has a bulk density of 22 kg./m.$^3$ and is heat resistant up to 128° C. It is not possible to detect any shrinkage after boiling in water.

*Example 2*

In accordance with the data given in Example 1, 2,920 parts by weight of adipic acid, 1,480 parts by weight of phthalic anhydride, 7,100 parts by weight of trimethylol propane, and 2,830 parts by weight of oleic acid are condensed to form a polyester with an acid number of 0 and hydroxyl number of 320. About 100 parts of this polyester are mixed with 3 parts of N-diethyl ethyl amine phenyl ether, 1 part of permethylated diethylene triamine and 4 parts of sodium salt of a sulfonated castor oil (water content 54%). About 80 parts of toluylene diisocyanate are sprayed into this mixture in a spraying chamber. The cellular polyurethane plastic formed has a bulk density of 30 kg./m.$^3$ and is heat resistant up to 146° C.

*Example 3*

In accordance with the data given in Example 1, 8,760 parts by weight of adipic acid, 17,760 parts by weight of phathalic anhydride, 29,000 parts by weight of glycerine, 17,000 parts by weight of oleic acid, and 2,000 parts by weight of triethanol amine are condensed to form a polyester with an acid number of 0 and an hydroxyl number of 370. About 100 parts of this polyester are homogenized with 7.5 parts of an activator mixture consisting of 3 parts of N-diethyl ethyl amine phenyl ether, 0.5 part of permethylated diethylene triamine and 4 parts of sodium salt of a sulfonated castor oil (water content 54%) and thereafter treated with 85 parts of toluylene diisocyanate. The cellular polyurethane plastic formed has a bulk density of 20 kg./m.$^3$ and is heat resistant up to 160° C.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. In the manufacture of cellular polyurethane plastics by a process which comprises reacting an organic polyisocyanate with water and an hydroxyl polyester the improvement which comprises reacting an excess of an organic polyisocyanate based on the hydroxyl groups of said polyester with water and a polyester having terminal hydroxyl groups, an hydroxyl number of at least about 250, an acid number less than two and prepared by condensing a polyhydric alcohol comprising at least about 50 percent of a polyhydric alcohol containing at least three hydroxyl groups, with a mixture of carboxylic acids comprising oleic acid, an aromatic dicarboxylic acid and a saturated aliphatic polycarboxylic acid, the molar ratio of said aromatic dicarboxylic acid to said saturated aliphatic polycarboxylic acid being within the range of from about 1:0.3 to about 1:2.

2. The product of the process of claim 1.

3. The process of claim 1 wherein said polyhydric alcohol containing at least three hydroxyl groups is a member selected from the group consisting of glycerol and trimethylol propane.

4. The process of claim 1 wherein said organic polyisocyanate is a toluylene diisocyanate.

References Cited in the file of this patent

UNITED STATES PATENTS

| | | |
|---|---|---|
| 1,912,200 | Hopkins | May 30, 1933 |
| 2,779,689 | Reis | Jan. 29, 1957 |
| 2,802,795 | Simon et al. | Aug. 13, 1957 |

OTHER REFERENCES

Barringer: "Rigid Urethane Foams-11 Chemistry and Formulation," Du Pont Elastomers Chem. Dept., Bulletin HR-26, April 1958, pages 25-59.